United States Patent [19]
Stahlecker

[11] 3,951,479
[45] Apr. 20, 1976

[54] THRUST BEARING FOR OPEN-END SPINNING ROTORS

[75] Inventor: Fritz Stahlecker, Bad Uberkingen, Germany

[73] Assignees: Hans Stahlecker; Fritz Stahlecker, both of Germany

[22] Filed: Apr. 3, 1974

[21] Appl. No.: 457,500

[30] Foreign Application Priority Data
Apr. 6, 1973 Germany............................ 2317306

[52] U.S. Cl. ............................................. 308/172
[51] Int. Cl.² ................... F16C 1/24; F16C 19/12
[58] Field of Search ................................... 308/172

[56] References Cited
UNITED STATES PATENTS

| | | | |
|---|---|---|---|
| 755,703 | 3/1904 | Sanger | 308/172 |
| 1,500,523 | 7/1924 | Osteman | 308/172 |
| 1,625,568 | 4/1927 | Shaw | 308/172 |
| 1,670,308 | 5/1928 | Marden | 308/172 |
| 1,943,167 | 1/1934 | Dieter | 308/172 |
| 2,587,408 | 2/1952 | Trask | 308/172 |
| 3,877,212 | 4/1975 | Canzler | 308/172 |

*Primary Examiner*—Lloyd L. King
*Attorney, Agent, or Firm*—Craig & Antonelli

[57] ABSTRACT

The spinning rotors of the individual spinning units of an open-end spinning machine have shafts with which they are mounted in bearings. The end of each shaft is in an axial supporting relationship with a freely rotatable ball, whereby the holder is designed in such a manner that it can be caused to oscillate or vibrate through the oscillation of the machine, etc.

11 Claims, 6 Drawing Figures

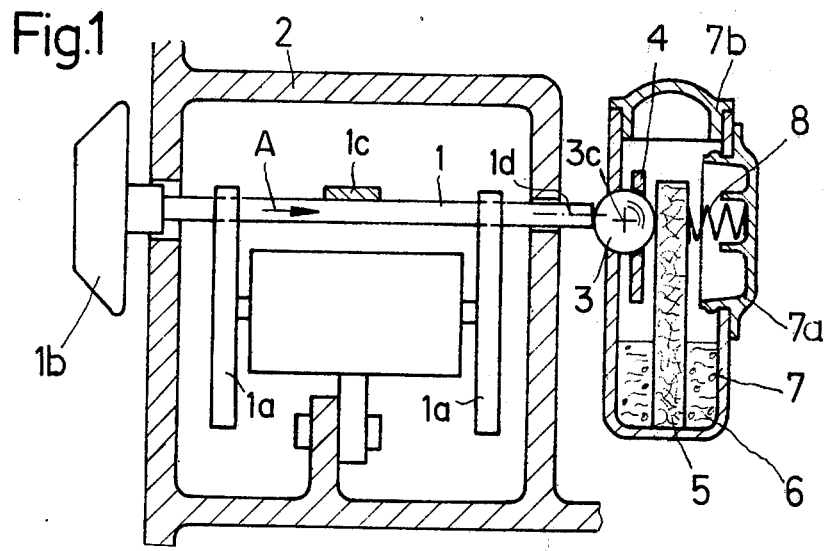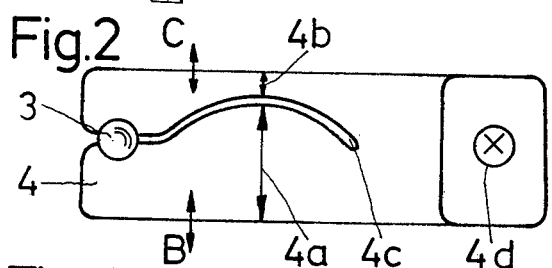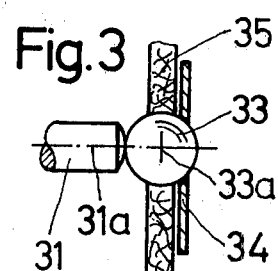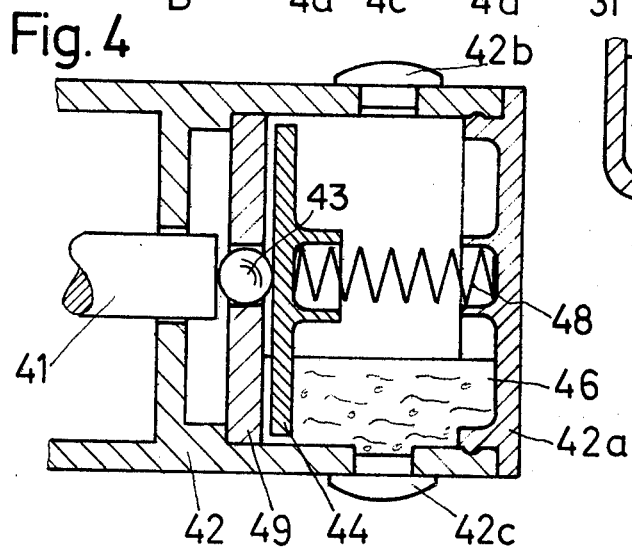

THRUST BEARING FOR OPEN-END SPINNING ROTORS

The present invention relates to bearing means for open-end spinning rotors whose shaft is supported in a thrust bearing in a contacting relationship at the end of said shaft, said thrust bearing serving as a movable supporting surface.

The arrangement of a movable contacting plate ensures that the point of contact of the end of the shaft changes continuously, thereby greatly increasing the supporting surface of the thrust bearing which is subject to wear. It is therefore possible to employ commercially available materials, which are easily worked and not expensive, for the thrust bearing. Moreover, this type of bearing operates quietly and requires only slightly more power for driving the spinning rotors.

However it has been shown that in spite of improvements over previous models, there are still difficulties with the movable, plate-shaped contacting surface, as the speeds of the individual movable thrust plates are not uniform. This circumstance places high requirements on the adjustments, as it is necessary to prevent some thrust bearings from not moving and others from moving too rapidly, which could result in an undesirable oil mist in the air.

It is the object of the present invention to further improve the bearing means of the type indicated at the outset and to ensure that movement of the contacting surfaces is maintained at all thrust bearings with a minimum of adjusting effort, whereby differing speeds cannot have a disadvantageous effect. According to the present invention, a freely rotatable ball, in a supporting relationship with holding means which can be oscillated, is provided as said supporting surface. The almost point-shaped contacting relationship between the end of the shaft and the ball results in reduced friction. The oscillating retaining means permit the ball to be caused to vibrate lightly through machine oscillations, e.g. through the rotation of the rotor shaft or the operation of the tangential belt, etc., thereby dependably keeping it in motion and preventing it from stopping. The ball acts as a reducing bearing, as the shaft, which rotates at high speed, is not in a direct supporting relationship with a stationary surface, since the ball is interposed as a slowly moving intermediate member.

In a further development of the invention, the motion of the ball can be controlled in that the axis of the shaft, which is preferably limited by a plane or slightly convex surface, extends past the center of the ball at a distance therefrom. The resulting eccentricity should only be relatively minor in order to keep the rotary movement of the ball, caused by the shaft, relatively small. As a result of this measure, wear can be kept especially small.

If especially favourable pairs of materials are employed between the rotor shaft and the ball, in actual practice it will always be favourable if, in a further development of the invention, lubricant supply means are associated to the ball. In this connection, it is especially advantageous from a design standpoint for said lubricant supply means to consist of a body of impregnable material which is immersed in lubricant and is in a contacting relationship with the ball. This type of lubricant supply means provides the ball with only enough lubricant as is actually required.

The above discussed and other objects, features and advantages of the present invention will become more apparent from the following description thereof, when taken in connection with the accompanying drawings, in which FIG. 1 shows a bearing means for open-end spinning rotors with a thrust bearing housing;

FIG. 2 shows the ball supporting means, viewed in direction A of FIG. 1;

FIG. 3 shows a thrust bearing similar to that shown in FIG. 1, in which the impregnable material rests on the ball through its own weight;

FIG. 4 shows a thrust bearing without housing with impregnable supporting means;

Figure 5:
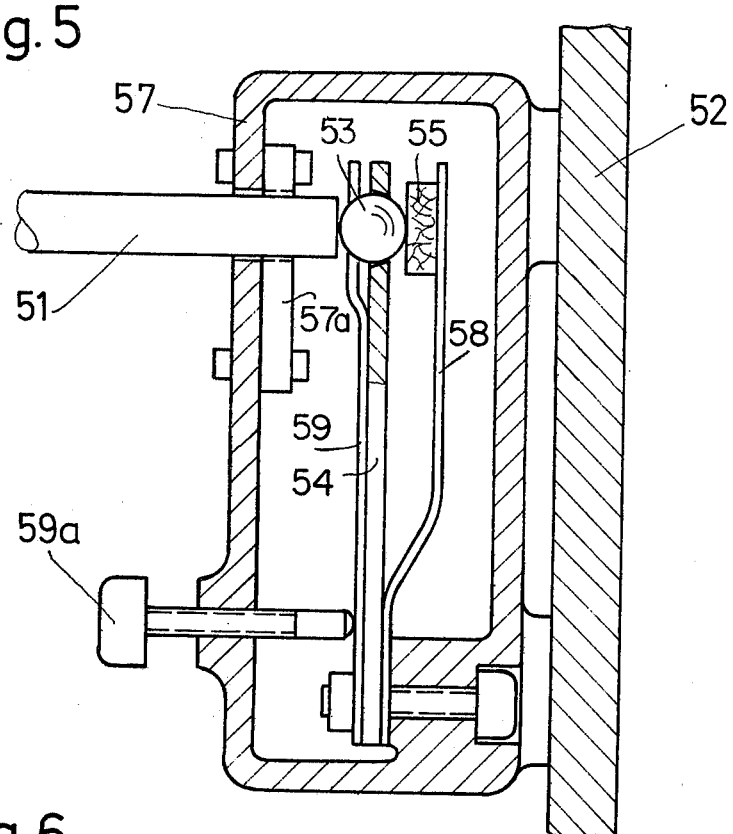
FIG. 5 shows a thrust bearing from above, having means for longitudinal adjustment of the rotor shaft.

Referring now to the drawings, wherein like reference numerals designate like parts throughout the several views, FIG. 1 shows the shaft 1 of a spinning rotor 1b mounted in wedges in two pairs of supporting rollers 1a and driven by a tangential belt 1c. The entire radial rotor mounting means are contained in a housing 2. The end of shaft 1 protrudes beyond housing 2 and is axially supported by the spherical surface of a freely rotatable ball 3. Ball 3, in turn, is in a supporting relationship with an oscillating holder 4. An impregnable material 5, e.g. a piece of felt or a wick, etc., immersed in a lubricant bath or reservoir 6, is pressed lightly against ball 3 by means of a spring 8, so that as a result of the capillary effect, liquid lubricant, e.g. oil, is absorbed. The lubricant is supplied to the periphery of ball 3 by the impregnable material 5 and distributed to all points of support through the rotation of ball 3. The thrust bearing which includes the ball 3 and the oscillating holder 4 is contained in a housing 7 with a lid 7a, which guides and locates spring 8. In addition, housing 7 also has a closure 7b for adding lubricant.

FIG. 2, which is a view of FIG. 1 in the direction of the arrow, shows the supporting relationship of ball 3 with oscillating holder 4. Oscillating holder 4, which is attached to housing 7 with fixing means 4d, has a slot 4c, which divides it into two unequally shaped legs 4a and 4b, which have locating surfaces for ball 3 in each of their free ends. Through their differing configuration, each leg of oscillating holder 4 is excited to oscillate at a different frequency through the rotation of the rotor shaft, etc., thus dependably keeping ball 3 rotating and preventing it from stopping. In many cases, differing frequencies are not required for preventing ball 3 from stopping. However the oscillating holder must ensure that ball 3 is supported in such a manner that it can easily vibrate, whereby said vibration is caused through a machine vibration.

FIG. 1 further shows that the axis 1d of shaft 1 does not extend through the center 3a of ball 3.

FIG. 3 shows a rotor shaft 31 which is in a supporting relationship with a ball 33, whereby the impregnable material 35 rests on ball 33 through its own weight and is immersed in a lubricant bath 36. Ball 33 is in a supporting relationship with oscillating holder 34. In this embodiment, the axis 31a of shaft 31 extends through the center 33a of ball 33.

In FIG. 4, bearing housing 42, which contains the radial bearing means of rotor shaft 41, is also the housing for the thrust bearing which comprises a ball 43, a plate 44, and a plate 49. In this embodiment, ball 43 is located in the hole of a plate 49 with play and, in turn, is in a supporting relationship with a plate 44, acting as an oscillating holder, which consists of an impregnable material. A porous body of a sintered material can be employed, for example, herefor. Thus, this oscillating holder 44 can absorb the lubricant 46 and supply it to ball 43. A spring 48 supports oscillating holder 44 against the lid 42a of housing 42. Housing 42, in turn, has two oil inlet and drain openings, which are sealed by means of stoppers 42b and 42c.

FIG. 5 shows an especially advantageous embodiment of the invention. Housing 57 of the thrust bearing which comprises ball 53, a holder 54, and a member 59, viewed from above, is attached to a machine frame 52. Rotor shaft 51 is in a slightly eccentric supporting relationship with ball 53 which, in turn, is in a supporting relationship with oscillating holder 54. An impregnable material 55 is pressed against ball 53 lightly by means of a pressure spring 58. A sheet-metal member 59 prevents ball 53 from falling out if there is no axial force from shaft 51, as is the case when disassembled. A centering plate 57a simultaneously prevents dirt from penetrating into the lubricant chamber. With the aid of an adjusting screw 59a, it is possible to adjust oscillating holder 54 in the event of wear of the impregnable material 55, thus regulating the axial pressure of shaft 51 without having to stop the rotor. The adjusting screw, which is easily accessible from the outside, can be provided for either one or a plurality of rotors. In the latter case, oscillating holder 54 and retaining plate 59 are designed as longitudinal rails.

Figure 6:
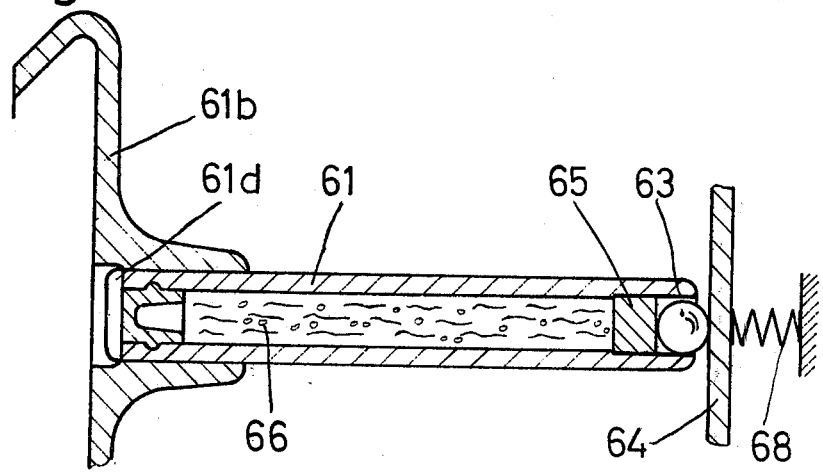
FIG. 6 shows lubricant supply extending through the rotor shaft.

FIG. 6 shows a shaft 61 of rotor 61b, in which lubricant 66 is supplied to a ball 63 through a hollow area. An impregnable material 65, e.g. a porous plate, separates the oil chamber from the ball 63, which is retained axially by the impregnable material and radially by the hollow shaft 61. Ball 63, and with it shaft 61, are in a supporting relationship with oscillating holder 64, which is retained with a spring 68.

Obviously, many modifications and variations of the present invention are possible in the light of the above teachings. It should therefore be understood that within the scope of the appended claims, the invention may be practised otherwise than as specifically described.

Having thus fully disclosed our invention, what I claim is:

1. Bearing means for a machine having a spinning rotor with a shaft, comprising a thrust bearing which includes a movable spherical supporting surface in contact with the shaft, a lubricant reservoir, impregnable material in communication with lubricant in the reservoir and with the spherical supporting surface, and oscillating holder means for holding said spherical supporting surface such that said supporting surface is caused to vibrate by virtue of machine oscillations.

2. The bearing means according to claim 1, wherein said supporting surface is a ball freely rotatably held by said oscillating holder means.

3. The bearing means according to claim 2, wherein said oscillating holder means is associated with the machine at a point remote from the area where said ball is held by said holder means.

4. The bearing means according to claim 1, in which the end of the shaft of said spinning rotor has a slightly convex surface.

5. The bearing means according to claim 2, in which the axis of the shaft of said spinning rotor extends past the center of the ball eccentrically at a distance therefrom.

6. The bearing means according to claim 1, wherein at least a part of the oscillating holder comprises the impregnable material.

7. The bearing means according to claim 2, wherein the lubricant reservoir is formed by the rotor shaft which is at least partially hollow and filled with lubricant and the impregnable material seals the end of the shaft.

8. The bearing means according to claim 1, wherein a plate which is designed so as to be elastically yielding axially to the axis of said shaft serves as the oscillating holder.

9. The bearing means according to claim 8, wherein a plate of an elastic material is provided as said oscillating holder, whereby said plate has a spherical recess for said ball and is attached to the housing of said thrust bearing on one side at a distance from said recess.

10. The bearing means according to claim 9, wherein said plate has a slot extending from the area of its point of attachment to the recess for the ball, said slot preferably extending in a curved manner.

11. The bearing means according to claim 1, wherein said oscillating holder is arranged adjustably in the axial direction of said shaft of the rotor.

* * * * *